(12) United States Patent
Anderson

(10) Patent No.: US 9,073,404 B2
(45) Date of Patent: *Jul. 7, 2015

(54) SNOWMOBILE ENGINE HEAT TRANSFER SYSTEM

(71) Applicant: Eric Anderson, Enumclaw, WA (US)

(72) Inventor: Eric Anderson, Enumclaw, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,789

(22) Filed: Oct. 28, 2013

(65) Prior Publication Data

US 2014/0174841 A1    Jun. 26, 2014

Related U.S. Application Data

(63) Continuation of application No. 12/857,153, filed on Aug. 16, 2010, now Pat. No. 8,567,545.

(60) Provisional application No. 61/234,121, filed on Aug. 14, 2009.

(51) Int. Cl.
*B60H 1/00*    (2006.01)
*B60H 1/16*    (2006.01)
*B62J 99/00*    (2009.01)

(52) U.S. Cl.
CPC ..... *B60H 1/00271* (2013.01); *B62J 2099/0033* (2013.01); *B62J 2099/0026* (2013.01); *B62J 99/00* (2013.01); *B60H 1/00564* (2013.01); *B60H 1/16* (2013.01)

(58) Field of Classification Search
CPC .................................. B60H 1/16; B60H 1/002
USPC .......... 180/182; 280/288, 276, 279, 275, 277, 280/283; 248/231.61, 73, 74.4, 481, 248/231.85, 288.31, 315, 316.1, 316.6, 689, 248/224.61, 309.1, 223.21, 311.2, 201, 248/222.12, 904, 27.1, 413, 424, 447, 450
See application file for complete search history.

(56) References Cited

U.S. PATENT DOCUMENTS 5,855,388 A * 1/1999 Brewer ....................... 280/288.4

* cited by examiner

*Primary Examiner* — Joseph Rocca
*Assistant Examiner* — Jacob Knutson
(74) *Attorney, Agent, or Firm* — Dean A. Craine

(57) ABSTRACT

An engine heat transfer system for a snowmobile in which heated air at generated by an engine inside the snowmobile's engine compartment and delivered to a hole formed in the dashboard and re-directed to a desired area rearward of the dashboard towards the driver. A bracket is positioned over the hole in the dashboard that contains openings that re-directs the heated air.

1 Claim, 6 Drawing Sheets

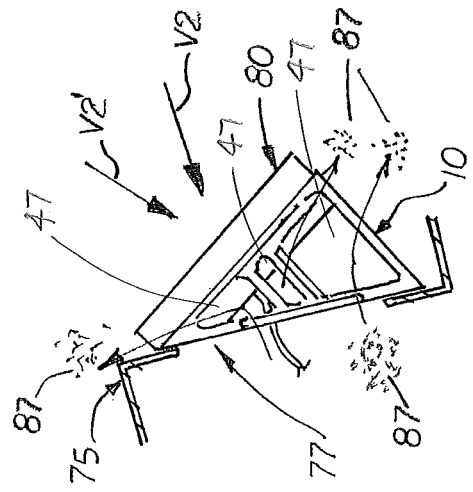
*FIG. 3*
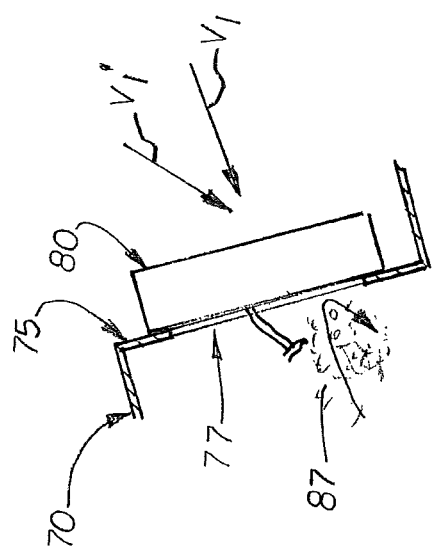
PRIOR ART    *FIG. 2*

SNOWMOBILE ENGINE HEAT TRANSFER SYSTEM

This is a continuation patent application which claims benefit of U.S. utility patent application Ser. No. 12/857,153, filed on Aug. 16, 2010 with claimed the filing date benefit of U.S. provisional application No. 61/234,121, filed on Aug. 14, 2009.

BACKGROUND OF THE INVENTION

1. Field of the Invention

This invention pertains to an all terrain vehicle dashboard gauge and air vent system, and more particularly to dashboard gauge and air vent systems specifically designed for a snowmobile that enables a speedometer or tachometer gauge to be repositioned for viewing while riding a snowmobile in a sitting or standing position and also provides additional ventilation for cooling the engine.

2. Description of the Related Art

Snowmobile engines are air-cooled and require air ventilation during operation. Unfortunately, the engines are enclosed in a protective cowling that restricts air ventilation.

Snowmobile riders either sit or stand up on their snowmobiles. When riding in either position, the snowmobile rider must view the speedometer or tachometer gauge mounted on the dashboard. Unfortunately when standing, the dashboard is located below the rider's field of view which forces the driver to turn his or her head and look downward and take his or her eyes off the trail. When riding over rough terrain or at high speeds, taking his or her eyes off the trail for a few seconds can be dangerous.

SUMMARY OF THE INVENTION

It is an object of the present invention to provide a bracket that can be attached to the existing dashboard on a snowmobile that enables the driver to re-position the gauges on the dashboard for easier viewing when sitting or standing.

It is another object of the invention to provide such a bracket that does not require structural modification of the snowmobile.

These and other objects are met by a snowmobile gauge mounting bracket with one or more air vents that allow hot gases from the engine to escape and flow through a hole formed in the dashboard for the speedometer or tachometer gauge. The bracket includes a lower dashboard mounting surface that attaches to the dashboard surface surrounding the existing hole in which a standard speedometer or tachometer gauge is normally placed. The bracket includes an upper gauge mounting surface on which a speedometer or tachometer gauge may be attached. In one embodiment, one or more top and side vent openings are formed in the bracket. In one embodiment, the upper gauge mounting surface and the lower mounting surface are aligned at an offset manner 5 to 50 degrees apart. In a second embodiment, the upper gauge mounting surface and the lower mounting surface are parallel.

During installation, the mounting bracket is coaxially aligned over the hole formed in the dashboard. The lower dashboard mounting surface is flush mounted on the outside surface of the dashboard. The bracket may be rotated over the outside surface of the dashboard so that the upper gauge mounting surface is selectively aligned for maximum viewing by a driver in a standing or a sitting position. Suitable connectors are then used to securely attach the bracket to the dashboard. A speedometer or tachometer gauge is then attached to the upper gauge mounting surface.

During use, heated air in the engine compartment flows upward and escapes through the top or side vent openings in the bracket and help cool the engine and to provide warm air to the driver.

BRIEF DESCRIPTION OF THE DRAWINGS

FIG. 2 is a partial, sectional side elevational view of the dashboard with a typical speedometer or tachometer gauge found in the prior art mounted thereon.

FIG. 3 is a partial, sectional side elevational view of the dashboard with the gauge mount bracket attached to the dashboard and the speedometer or tachometer gauge repositioned on the gauge mounting bracket.

DESCRIPTION OF THE PREFERRED EMBODIMENT(S)

Figure 1:
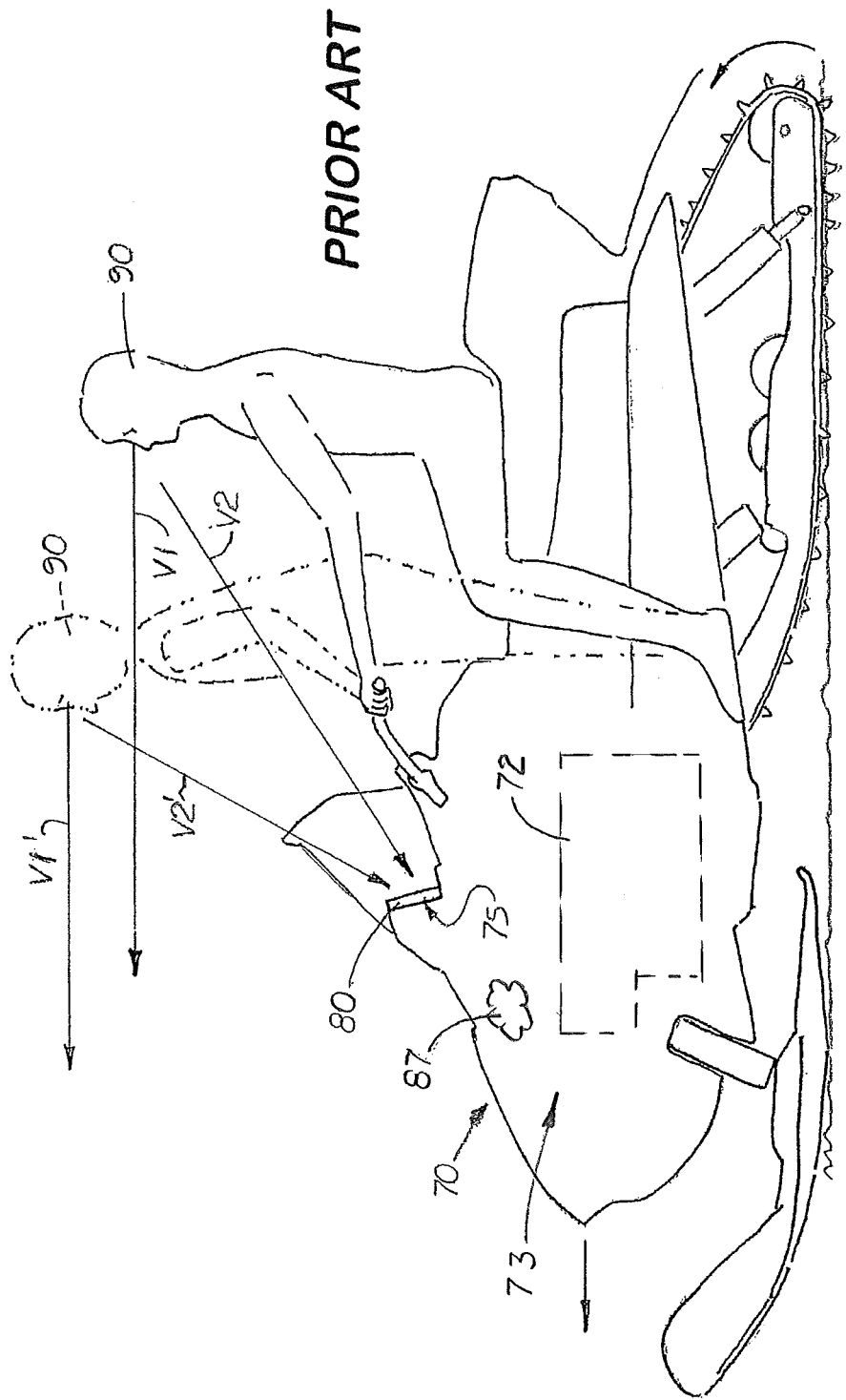
FIG. 1 is a side elevational view of a snowmobile in the prior art showing the dashboard with a typical speedometer or tachometer gauge mounted thereon and showing the forward terrain viewing angles and the gauge viewing angles of a sitting snowmobiler and a standing snowmobiler.

FIG. 1 is a side elevational view of a typical snowmobile 70 found in the prior art with an engine 72, an engine compartment 73, a dashboard 75, and a speedometer or tachometer gauge 80 attached to the dashboard 75. The dashboard 75 is slightly angled with a speedometer or tachometer gauge 80 flush mounted on the dashboard 75 and showing the approximate angles for viewing the gauge 80 by drivers 90, 90' in a sitting or standing position, respectively. Depicted in the FIG. 1, are the forward terrain viewing angles V1 and V1', and the gauge viewing angles V2 and V2' of the two drivers 90, 90'.

FIG. 2 is a partial side elevational view of the dashboard 75 on a snowmobile found in the prior art with the speedometer and tachometer gauge 80 mounted on the dashboard 75 and the buildup of heated air 87 inside the engine compartment 73 under the dashboard 75.

FIG. 3 is a partial, sectional side elevational view of the dashboard 75 with the gauge mounting bracket 10 attached to the dashboard 75 and the speedometer or tachometer gauge 80 repositioned on the upper gauge mounting surface on the gauge mounting bracket 10 and showing the heated air 87 escaping from the engine compartment 85 through side openings 47 and top opening 45.

Figure 4:
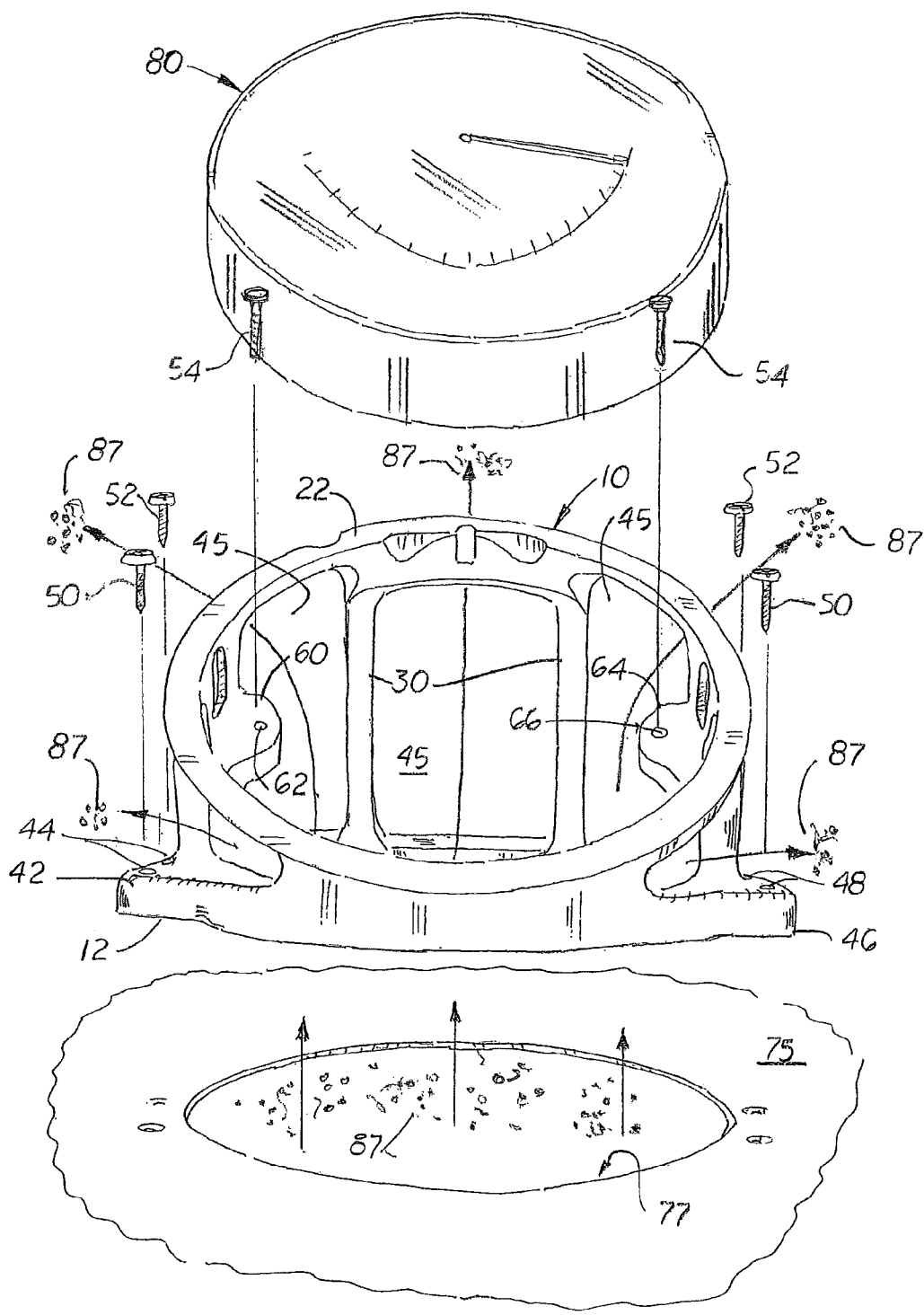
FIG. 4 is a top plan view of the dashboard showing the gauge mounting bracket being attached over a hole formed on the dashboard and showing a speedometer or a tachometer gauge being mounted on the upper gauge mounting surface on the mounting bracket.
Figure 5:
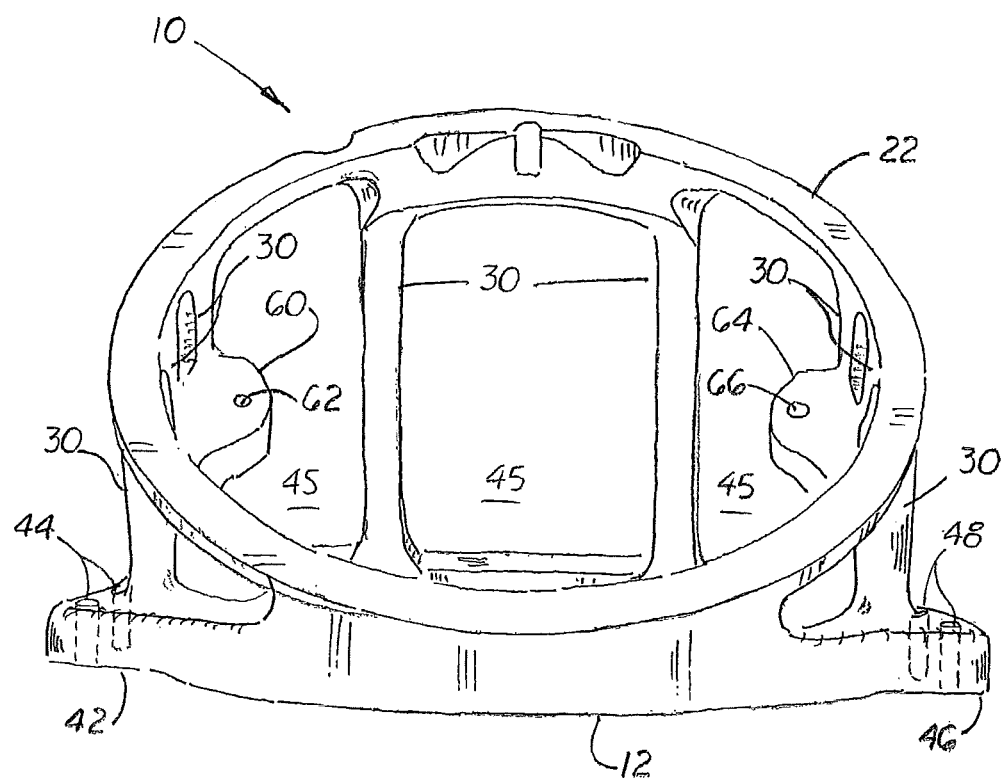
FIG. 5 is top elevational view of the gauge mounting bracket.
Figure 6:
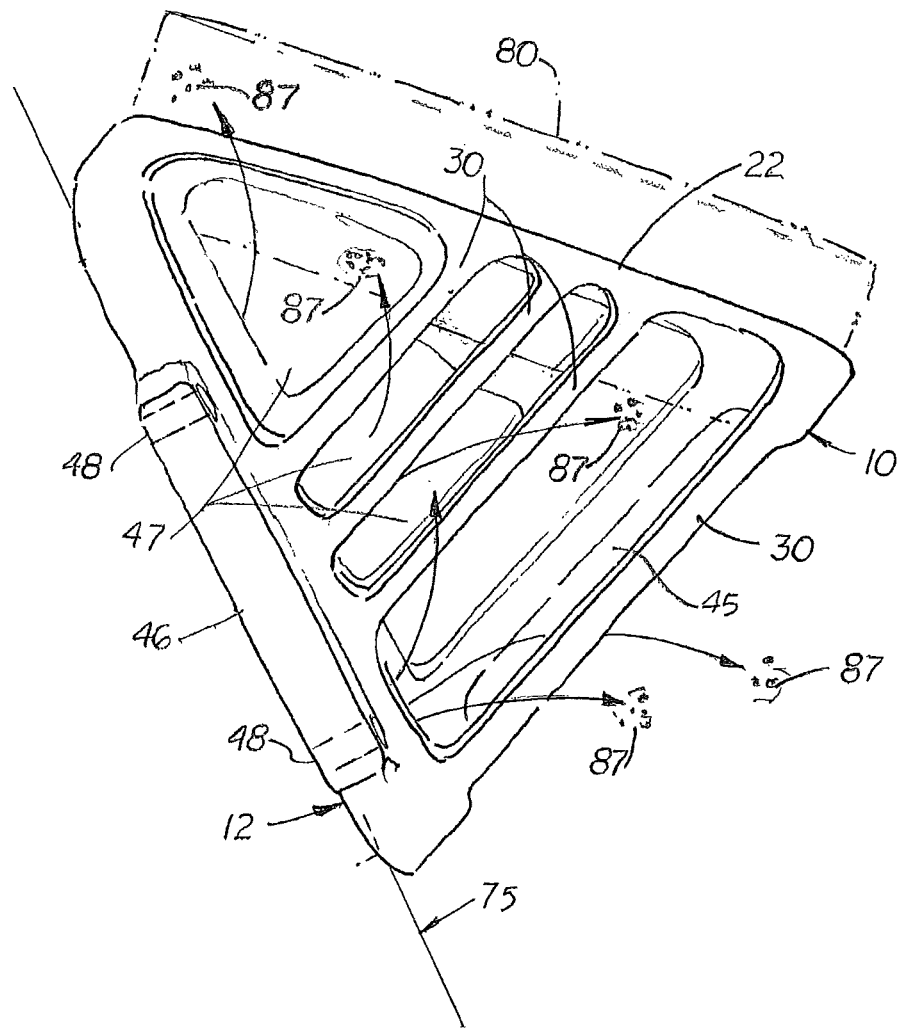
FIG. 6 is a side elevational view of the gauge mounting bracket.
Figure 7:
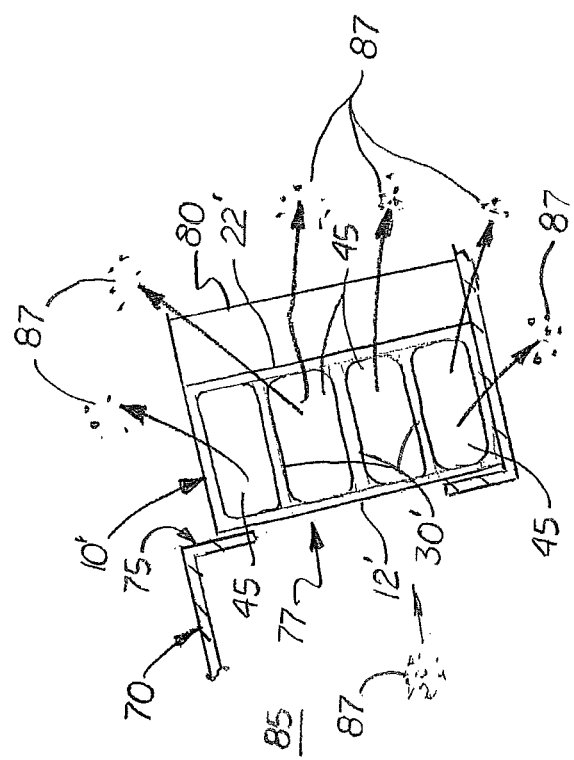
FIG. 7 is a partial, sectional side elevational view of a dashboard similar to the view shown in FIG. 3 showing a second embodiment of the gauge mounting bracket with parallel dashboard mounting and gauge mounting surfaces.

As shown in FIGS. 4-6, the first embodiment of the gauge mounting bracket 10 is shown that includes a lower dashboard mounting surface 12 that attaches to the dashboard 75 surrounding a gauge's pre-existing hole 77. In the first embodiment, the lower dashboard mounting surface 12 and the upper gauge mounting surface 22 are angled approximately 5 to 50 degrees apart. FIG. 7 shows a second embodiment of the bracket 10', in which the lower dashboard mounting surface 12' and the upper gauge mounting surface 22' are substantially parallel. The bracket 10' is used typically with snowmobiles in which the angle of the speedometer or tachometer gauge 80 on the dashboard 75 does not need to be altered.

Disposed between the lower dashboard mounting surface 12, 12' and the upper gauge mounting surface 22, 22' are a plurality of perpendicularly aligned support ribs 30, 30', respectively. The support ribs 30, 30' are spaced apart thereby creating a plurality of side vent openings 47 so that heated air 87 that flows upward from the engine compartment 73 located below the dashboard 75 may escape. In the first embodiment, there are two rear facing support ribs 30 and two sets of three ribs 30 formed on the lateral edges of the mounting bracket 10. Three elongated large top vent openings 45 are formed on the top surface of the bracket 10 and three smaller side vent openings 47 are formed on the two sides of the bracket 10, (see FIG. 7). The front edge of the lower dashboard mounting surface 12 is integrally formed with the front edge of the upper gauge mounting surface 22.

As shown in FIGS. 6 and 7, formed on the outer edges of the lower mounting surface 12 are two flanges 42, 46 with two non-threaded holes 44, 48, respectively, formed therein. During assembly, two threaded screws 50, 52 extend through complimentary size holes (not shown) formed in the dashboard 75 to securely attach the mounting bracket 10 to the dashboard 75. As shown on FIG. 5, formed on the inside of the two sets of triple ribs 30 are two inward extending ears 60, 64. Each ear 60, 64 includes a threaded bore 62, 66, respectively, designed to receive a screw 54 connected to the gauge 80 which holds the gauge 80 in a fixed position on the mounting bracket 10.

The diameter of the bracket 10 and the gauge 80 may be identical or variable. If the diameter of the gauge 80 is less than the diameter of the bracket 10, heated air 87 may escape through the top openings 45. Optional side panels may be placed around the side vent opening 47 to control the amount of heated air 87 flowing therethrough.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An engine heat transfer system for a snowmobile with an engine compartment that encloses an engine and a dashboard located rearward from the engine compartment, the system, comprising:
   a. a hole formed on said dashboard located behind said engine compartment that enables heated air produced by said engine and enclosed by said engine compartment to flow rearward and escape from said engine compartment; and,
   b. an angled bracket extending rearward and mounted over said hole formed on said dashboard, said bracket includes a lower dashboard mounting surface configured to be attached to said dashboard and allow heated air confined by said engine compartment to flow rearward and through said hole and into said bracket, said bracket includes a plurality of vents that redirects said heated air flowing into said bracket to a desired area rearward of said dashboard.

* * * * *